United States Patent
Gillis et al.

(10) Patent No.: US 6,390,053 B2
(45) Date of Patent: May 21, 2002

(54) REACTION CHAMBER ISOLATION CHECK VALVE AND GASEOUS FUEL ENGINE USING SAME

(75) Inventors: Edward R. Gillis, Bloomington; Dan R. Ibrahim, Normal; Harold E. Ogg, Jr., Dwight, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/560,018

(22) Filed: Apr. 27, 2000

Related U.S. Application Data
(60) Provisional application No. 60/131,736, filed on Apr. 30, 1999.

(51) Int. Cl.$^7$ ............................................. F02B 19/00
(52) U.S. Cl. ..................... 123/267; 123/276; 123/253; 123/261
(58) Field of Search ................... 123/253, 276, 123/267, 256, 260, 261, 266; 137/80, 516.15, 519.5

(56) References Cited

U.S. PATENT DOCUMENTS

| | | | |
|---|---|---|---|
| 1,998,785 A | 4/1935 | Mock ..................... | 123/143 B |
| 2,795,106 A | 6/1957 | Martin ..................... | 60/39.37 |
| 3,095,865 A | 7/1963 | Marks et al. ............... | 123/54.7 |
| 3,406,667 A | 10/1968 | Evans et al. ................ | 123/267 |
| 3,446,156 A | 5/1969 | Lightfoot .................... | 417/554 |
| 3,459,217 A | 8/1969 | Callahan ................. | 137/516.15 |
| 3,763,834 A | 10/1973 | Geiger et al. ............... | 123/258 |
| 3,871,351 A | 3/1975 | Geiger et al. ............... | 123/258 |
| 3,905,343 A | 9/1975 | Ryan ........................ | 123/277 |
| 4,006,725 A | 2/1977 | Baczek et al. ............... | 123/267 |
| 4,091,772 A | * 5/1978 | Heater et al. ............... | 123/575 |
| 4,338,897 A | 7/1982 | Drumheller et al. ........ | 123/267 |
| 4,389,999 A | * 6/1983 | Jaqua ......................... | 123/536 |
| 4,550,744 A | * 11/1985 | Igashira et al. ............... | 137/80 |
| 4,736,718 A | * 4/1988 | Linder ......................... | 123/267 |
| 5,222,993 A | * 6/1993 | Crane ........................ | 123/256 |
| 5,632,253 A | * 5/1997 | Paul et al. ................... | 123/531 |
| 5,791,374 A | 8/1998 | Black et al. ............. | 137/519.5 |
| 5,947,076 A | * 9/1999 | Srinivasan et al. ......... | 123/267 |

OTHER PUBLICATIONS

Author: Caterpillar, Inc. depicts a valve believed to have been in public use on Jul. 7, 1995.
Author: Caterpillar, Inc. depicts a valve believed to have been in public use on Oct. 7, 1997.
Author: Caterpillar, Inc. depicts a valve believed to have been in public use on Sep. 14, 1998.
Author: Catepillar, Inc. depicts a valve believed to have been in public use on Nov. 9, 1994.
Author: Caterpillar, Inc. depicts a valve believed to have been in public use on Dec. 16, 1998.
Author: Caterpillar, Inc. depicts a valve believed to have been in public use around June 1989.

* cited by examiner

*Primary Examiner*—Henry C. Yuen
*Assistant Examiner*—Hieu T. Vo
(74) *Attorney, Agent, or Firm*—Michael B. McNeil

(57) ABSTRACT

An internal combustion engine includes an engine housing that defines a main combustion chamber separated from a precombustion chamber by a flame communication passage way. A source of gaseous fuel is fluidly connected to one end of a fuel supply passage. A check valve, which includes a valve body with a valve seat, and a valve member, is positioned between the other end of the fuel supply passage and the precombustion chamber. The valve member is moveable between an open position and a closed position. The valve body and the valve member define a fluid passage that fluidly connects the fuel supply passage to the precombustion chamber when the valve member is in its open position. The valve body and the valve member substantially fluidly isolate the valve seat from the precombustion chamber when the valve member is in its closed position.

21 Claims, 4 Drawing Sheets

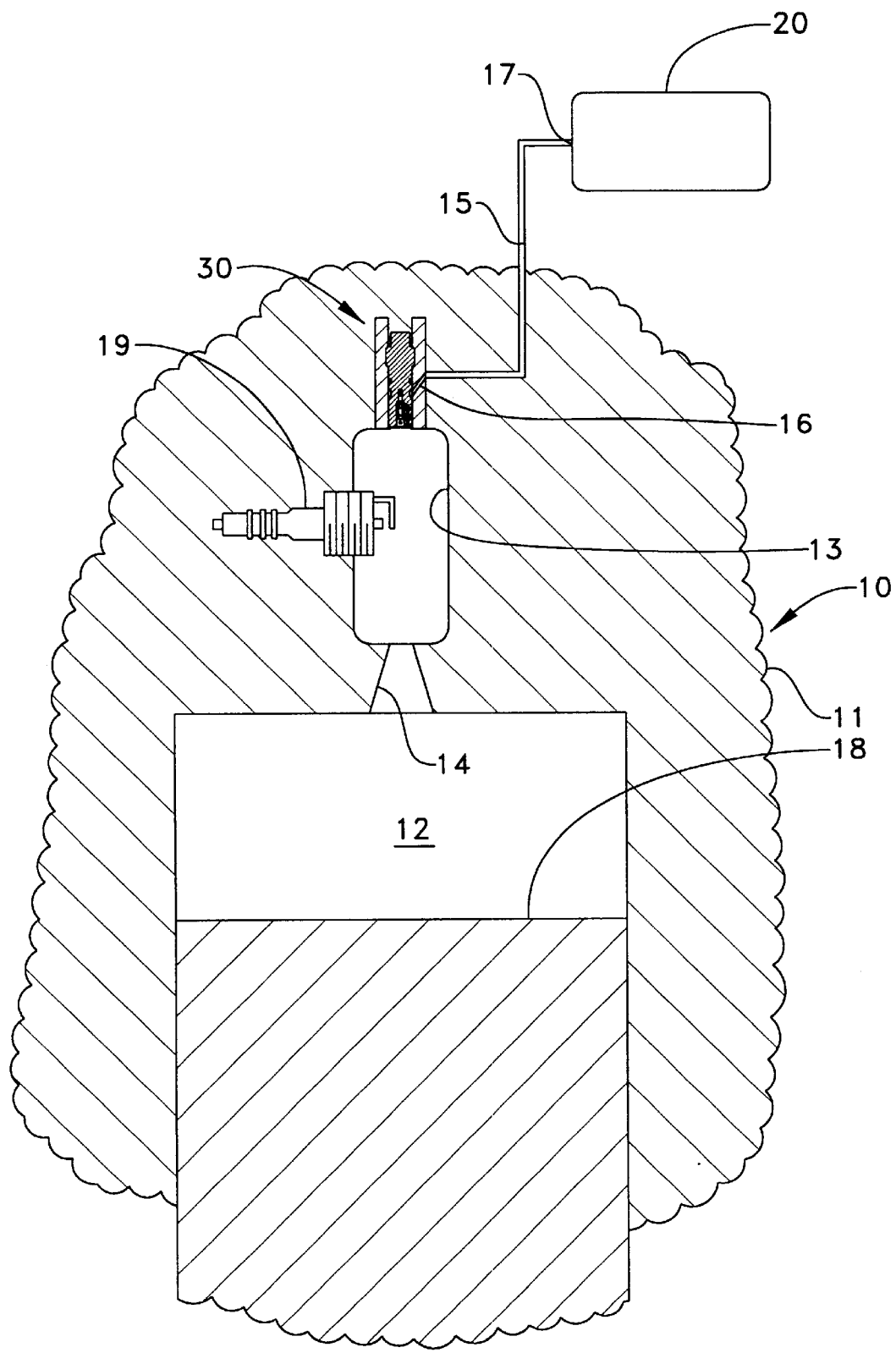
Fig_1_

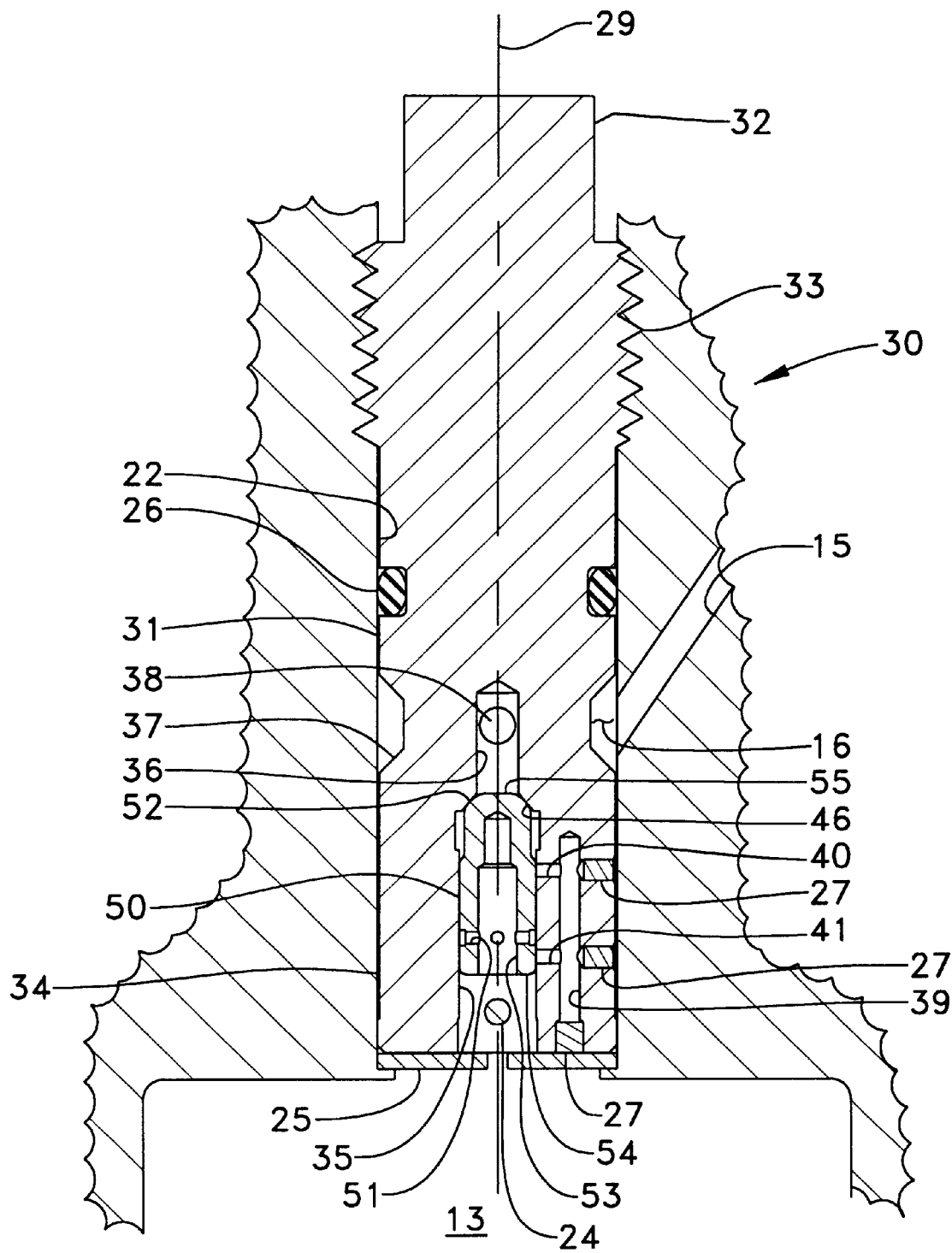
Fig_2_

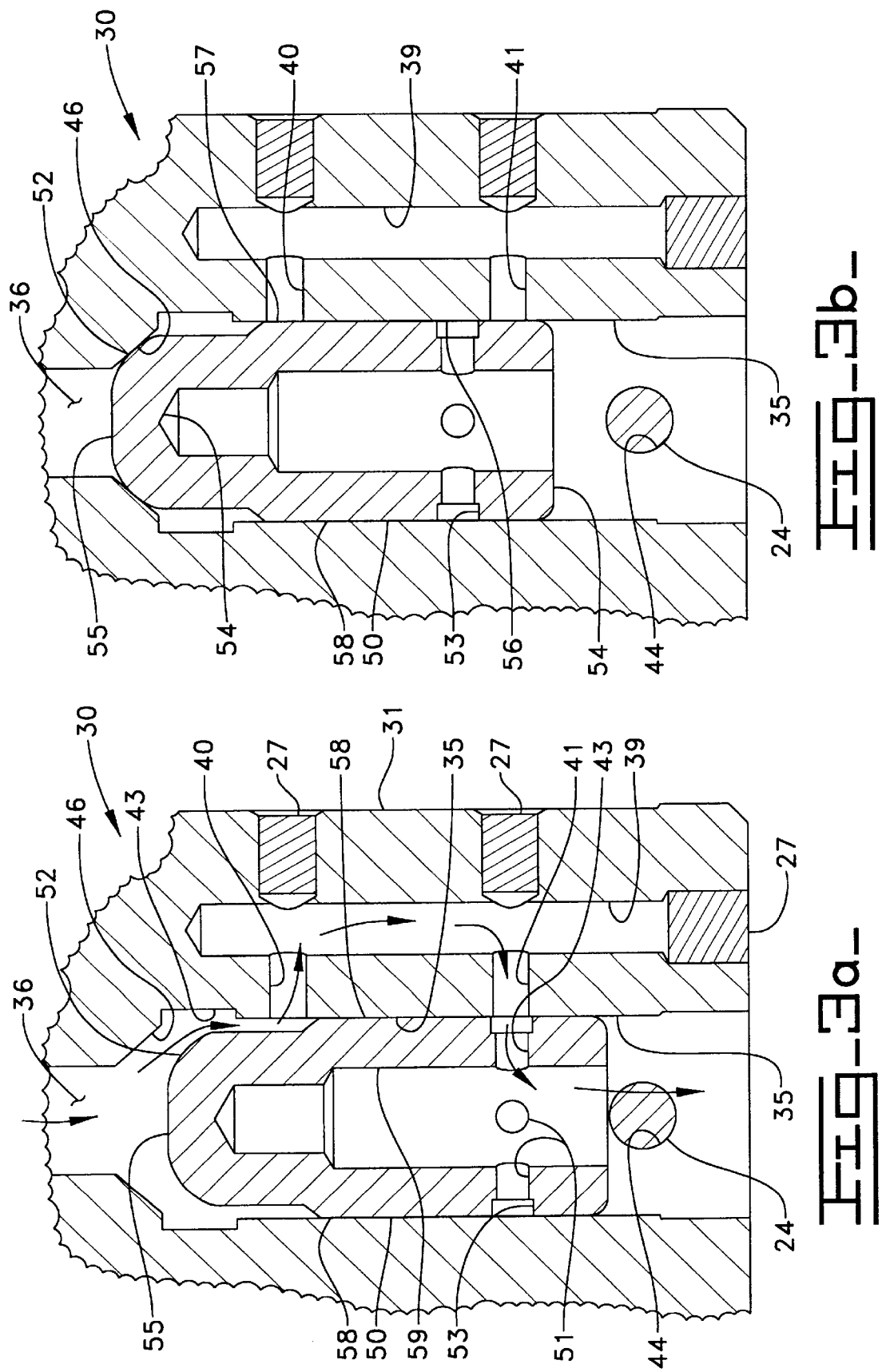

REACTION CHAMBER ISOLATION CHECK VALVE AND GASEOUS FUEL ENGINE USING SAME

Cross-Reference to Related Applications

This application claims the benefit under 35 U.S.C. §119 of prior provisional application no. 60/131,736 filed Apr. 30, 1999.

TECHNICAL FIELD

This invention relates generally to reaction chamber isolation check valves, and more particularly to a combustion isolation check valve for use adjacent a precombustion chamber of a gaseous fuel internal combustion engine.

BACKGROUND ART

In one class of internal combustion engines, gaseous fuel is supplied from one of a variety of sources, such as natural gas or gas produced from a landfill. While the chemical content of these sources of gaseous fuel can vary widely, they typically include substantial amounts of methane which is suitable for burning in gaseous fuel internal combustion engines. Depending to some extent upon the source, engineers have observed that some of the additional components of the gaseous fuel reveal themselves as solid deposits that are produced during combustion within the engine. In some instances, these solid deposits within the engine can cause inadequate valve sealing, which in turn can cause engine malfunctions, such as misfiring.

In an effort to reduce exhaust emissions from gaseous fuel type engines, there have been efforts to burn leaner gaseous fuel/air mixtures. In order to burn these leaner mixtures, some engines include a precombustion chamber, in fluid communication with a main combustion chamber. Typically, in these engines a rich mixture is placed in the precombustion chamber and a much leaner mixture in the main combustion chamber. Ignition of the rich mixture in the precombustion chamber is the means by which the lean mixture in the main combustion chamber is ignited. While this precombustion chamber concept has proved effective in reducing exhaust emissions in gaseous fuel type engines, the deposit of solids in and on the valve that separates the precombustion chamber from its fuel supply can cause engine misfiring.

In most of these systems, a simple ball check valve separates the precombustion chamber from its fuel supply. These systems are designed such that compression and combustion pressure hold the ball valve against its seat in a closed position to isolate the precombustion chamber from its fuel supply during the combustion event. For a number of reasons, including the deposit of solids on the valve seat and other possible reasons such as pressure wave dynamics and other reasons not fully understood, these ball check valves do not always seal adequately. This can allow combustion gases to travel up into the fuel supply passage. This in turn can cause engine misfiring.

The present invention is directed to these and other problems associated with combustion isolation check valves, especially as they relate to gaseous fuel type engines.

DISCLOSURE OF THE INVENTION

A combustion isolation check valve includes a valve body with a conical valve seat that defines an inlet and an outlet. A valve member is positioned in the valve body between the inlet and the outlet, and is moveable between an open position and a closed position. The valve body and the valve member define a fluid passage that fluidly connects the inlet to the outlet when the valve member is in its open position. The valve body and the valve member substantially fluidly isolate the valve seat from the outlet when the valve member is in its closed position. In one aspect of the invention, the inlet of the valve body is connected to a source of fuel, and the outlet of the valve body is fluidly connected to a precombustion chamber within an internal combustion engine.

BRIEF DESCRIPTION OF THE DRAWINGS

FIG. 1 is a partial sectioned side elevational view of an internal combustion engine according to one aspect of the present invention.

FIG. 2 is an enlarged sectioned side view of a combustion isolation check valve mounted adjacent a precombustion chamber according to one aspect of the present invention.

FIGS. 3a and 3b are enlarged partial sectioned side views of the combustion isolation check valve of FIG. 2 shown in its open and closed positions, respectively.

BEST MODE FOR CARRYING OUT THE INVENTION

Figure 4B:
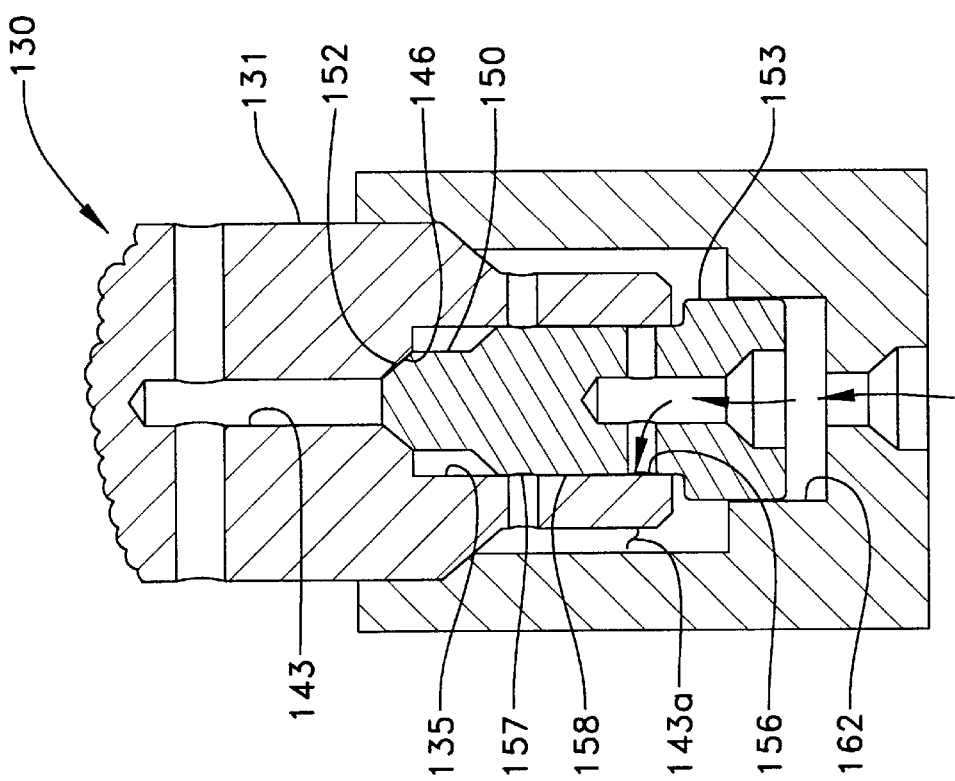
FIGS. 4a and 4b are enlarged partial sectioned side views of a combustion isolation check valve according to another embodiment of the present invention shown in its open and closed positions, respectively.

Referring now to FIG. 1, a gaseous fuel internal combustion engine 10 includes an engine housing 11 that defines a main combustion chamber 12 separated from a precombustion chamber 13 by a flame communication passageway 14. A combustion isolation check valve 30 is positioned between precombustion chamber 13 and a downstream end 16 of a fuel supply passage 15. A spark plug 19 or any other suitable ignition device is positioned within precombustion chamber 13. An upstream end 17 of fuel supply passage 15 is fluidly connected to a source of gaseous fuel 20. As with a typical internal combustion engine, a piston 18 reciprocates in main combustion chamber 12 with each engine cycle. Although only one piston 18 is shown, those skilled in the art will appreciate that the typical engine includes a plurality of pistons identical to that shown in FIG. 1.

Referring now to FIG. 2, the engine housing 11 defines a bore 22 within which combustion isolation check valve 30 is threadably mounted. In order to facilitate this mounting arrangement, check valve 30 preferably includes a valve body 31 with a lower cylindrical outer surface 34 separated from a hex head 32 by a set of threads 33. Valve body 31 is preferably generally symmetrical about centerline 29. An o-ring 26 is mounted about the outer surface of valve body 31 in contact with bore 22 in order to prevent leakage in a conventional manner. The bottom surface of valve body 31 is separated from the precombustion chamber 13 by a washer 25. When properly mounted within an engine, the valve body 31 preferably defines an annulus 37 that is connected to the downstream end 16 of the fuel supply passage 15.

Referring now in addition to FIGS. 3a and 3b, a valve member 50 is movably positioned within an internal guide bore 35 defined by valve body 31. Valve member 50 is moveable between an upward closed position as shown in FIGS. 2 and 3b, and a downward open position as shown in FIG. 3a. When in its upward closed position, the valve surface 52 of valve member 50, which is preferably rounded, is received in contact with a conical valve seat portion 46 of valve member 31. When in its downward open position, valve member 50 is in contact with a cylindrical dowel 24 that is attached to and mounted in a dowel bore 44 defined by valve body 31. While check valve 30 is illustrated as using a cylindrical dowel 24 as the stop component to limit the travel of valve member 50, other suitable stop components known to those skilled in the art could be substituted. When valve member 50 is in its downward open position, a flow passage 43 defined by valve member 50 and valve body 31 fluidly connects the downstream end 16 of fuel supply passage 15 to the precombustion chamber 13.

Fluid passage 43 includes a number of segments including annulus 37, cross wise flow passages 38, internal flow bore 36, cross passage 40, parallel passage 39, cross passage 41, annulus 53, radial passages 51, centerline flow passage 59, and finally, the lower portion of internal guide bore 35. It is important to know that different segments of fluid passage 43 are preferably defined solely by respective components of check valve 30. In particular, valve body 31 defines upstream portions of fluid passage 43 which includes cross wise flow passages 38 and internal flow bore 36 In addition, valve body 31 also defines cross passages 40 and 41 as well as parallel passage 39. After machining cross passages 40 and 41 as well as parallel passage 39, the same are isolated from the outer surface of valve body 31 by the inclusion of set screws 27. Those skilled in the art will appreciate that any suitable fluid plug could be substituted in the place of set screw 27.

Valve member 50 defines different segments of fluid passage 43, including radial passages 51 and centerline flow passage 59. When valve member 50 is in its upward closed position, conical valve seat 46 is substantially fluidly isolated from precombustion chamber 13 due to the spool valve interaction of valve member 50 with guide bore 35 and cross passages 40 and 41. In particular, the outer cylindrical guide surface 58 of valve member 50 is preferably a match clearance with the inner diameter of guide bore 35 such that fluid volumes above and below this guided area are substantially fluidly isolated from one another. In addition, several segments of fluid passage 43 are substantially fluidly isolated when valve member 50 is in its upward closed position. These include cross passages 40 and 41 as well as parallel passage 39. This spool valve action can be thought of as creating at least two blocking locations in fluid passage 43. One blocking location includes the internal wall portion of guide bore 35 that is adjacent annulus 53, and a second blocking location of fluid passage 43 can be thought of as the outer guide surface 58 of valve member 50 that is positioned adjacent the opening of cross passage 40.

Although valve member 50 could be mechanically biased in one direction or another by the inclusion of a spring, it is preferably not mechanically biased such that fluid pressures existing in the fluid supply passage 15 and the precombustion chamber 13 provide whatever necessary pressure differential that is needed to move valve member 50 in one direction or the other. Thus, valve member 50 can be thought of as including an opening fluid pressure surface 55 that is exposed to fluid pressure in internal flow bore 36, and a closing fluid pressure surface 54 that is exposed to fluid pressure in the lower portion internal guide bore 35, which communicates with precombustion chamber 13. Preferably, the conical valve seat 46, the guide bore 35, the guide surface 58 and valve surface 52 all share a common centerline 29. In order to simplify the manufacture of valve body 31, the parallel passage segment 39 of fluid passage 43 is preferably parallel to centerline 29.

Figure 4A:
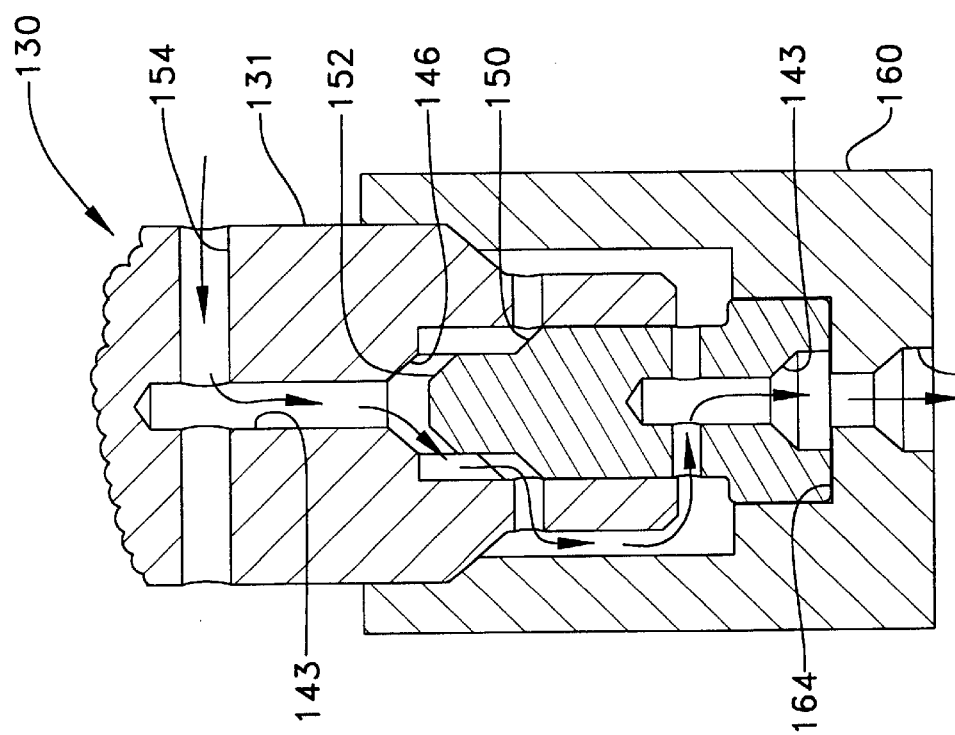

Referring now to FIGS. 4a and 4b, an alternative embodiment of a check valve 130 is illustrated. In this additional embodiment, an end cap 160 is used as the stop component for valve member 150 instead of the cylindrical dowel of the previous embodiment. Like the previous embodiment, a valve body 131 defines a guide bore 135 within which a valve member 150 is guided between an upward closed position as shown in FIG. 4b and a downward open position as shown in FIG. 4a. When valve member 150 is in its downward open position, a fluid passage 143 connects an inlet 154 to an outlet 165. If check valve 130 were mounted in an engine, in its preferred application, inlet 154 would be connected to the downstream end of a fuel supply passage, and the outlet 165 would open to a precombustion chamber. Although check valve 130 has some different geometry from that shown in the earlier embodiment, it functions essentially the same way in that pressure differentials in the upstream in the inlet versus the outlet control the position of the valve member, which is preferably mechanically unbiased.

When valve member 150 is in its upward closed position, its conical valve surface 152 is seated in conical valve seat 146. The interaction of the valve body and valve member serves to substantially fluidly isolate the conical valve seat 146. In particular, when valve member 150 is in its upward closed position, a first blocking location 156 is created where a cross passage in valve member 150 opens against the wall of guide bore 135. A blocking location 157 occurs where fluid passage 143 opens against the outer guide surface 158 of valve member 150. In this example, a third blocking location occurs in the clearance between cylindrical portion 153 and the cylindrical bore 162 defined by end cap 160, which can be considered a portion of valve body 131. When valve member 150 is in its upward closed position, a segment 143a of fluid passage 143 is substantially fluidly isolated from both the upstream inlet 154 and the downstream outlet 165 due to the blocking locations described previously. When valve member 150 is in its downward open position, its bottom surface is in contact with a stop surface 164, which is a portion of end cap 160.

Industrial Applicability

Although the present invention has been illustrated as preferably for use as a combustion isolation check valve in a gaseous fuel engine, it could potentially be used in other places where there is a need to isolate a valve seat of a valve positioned adjacent a chemical reaction chamber or space. Thus, the combustion isolation check valve of the present invention could find potential application in stratified engines, if needed, and possibly even in some non-engine applications where there is a need to isolate a chemical reaction chamber, particularly one in which solids are produced by the reaction. In the illustrated embodiment, the precombustion chamber can be thought of as a reaction chamber, and the chemical reaction in the example is oxidation or combustion.

Referring back to FIG. 1, when engine 10 is undergoing the intake portion of its cycle, check valve 30 opens and allows relatively pure gaseous fuel (not mixed with air) to flow into precombustion chamber 13. Due, at least in part to the fluid connection provided by flame transfer passage 14, some air from the relatively lean mixture existing in main combustion chamber 12 makes its way into precombustion chamber 13 to provide a relatively rich fuel/air mixture for ignition by an appropriate ignition device 19. When piston 18 begins moving upward for the compression stroke, this raises pressure both in main combustion chamber 12 and precombustion chamber 13 and provides a means by which some of the air in the lean air mixture in main combustion chamber 12 can find its way into precombustion chamber 13. As pressure rises, it eventually produces a fluid pressure imbalance on the check valve 30 causing it to move towards its closed position. At an appropriate timing, the combustion event takes place. Check valve 30 prevents the hot combustion gases from penetrating into the fuel supply passage 15, and does so in a way that substantially fluidly isolates the valve seat. By substantially fluidly isolating the valve seat, solid combustion byproducts are unable to deposit on or near the seat in a way that could hinder the check valve's ability to completely close during subsequent combustion events.

It should be understood that the above description is intended for illustrative purposes only, and is not intended to limit the scope of the present invention in any way. For instance, those skilled in the art will recognize that the check valve of the present invention could include a broad variety of different geometric features and still fall within the contemplated scope of the present invention. Thus, those skilled in the art will appreciate the various modifications could be made to the disclosed embodiments without departing from the intended scope of the present invention, which is defined in terms of the claims set forth below.

What is claimed is:

1. An internal combustion engine comprising:
    an engine housing defining a main combustion chamber separated from a precombustion chamber by a flame communication passageway, and further defining a fuel supply passage with one end and an opposite end;
    a source of fuel fluidly connected to said opposite end of said fuel supply passage;
    a check valve, which includes a valve body with a valve seat and a valve member, positioned between said one end of said fuel supply passage and said precombustion chamber, and said valve member being movable between an open position and a closed position;
    said valve body and said valve member defining a fluid passage that fluidly connects said fuel supply passage to said precombustion chamber when said valve member is in said open position; and
    said valve body and said valve member substantially fluidly isolating said valve seat from said precombustion chamber when said valve member is in said closed position.

2. The engine of claim 1 wherein said source of fuel is a source of gaseous fuel.

3. The engine of claim 1 wherein each of said valve member and said valve body define different segments of said fluid passage.

4. The engine of claim 1 wherein said valve body defines a guide bore;
    said valve member includes a guide surface guided in said guide bore and a valve surface positioned adjacent said valve seat; and
    said valve seat, said guide bore, said guide surface and said valve surface all share a common centerline.

5. The engine of claim 1 wherein said valve member has a centerline; and
    a segment of said fluid passage is defined by said valve member and extends along said centerline.

6. The engine of claim 1 further comprising a stop component attached to said valve body;
    said valve member being in contact with said stop component when in said open position, but being out of contact with said stop component when in said closed position.

7. The engine of claim 6 wherein said stop component is at least one cylindrical dowel.

8. The engine of claim 1 wherein said valve member has a first fluid pressure surface exposed to fluid pressure in said precombustion chamber, and an opposing fluid pressure surface exposed to fluid pressure in said fuel supply passage.

9. The engine of claim 1 wherein said valve member is mechanically unbiased.

10. The engine of claim 1 wherein said valve body and said valve member block said fluid passage in at least two locations when said valve member is in said closed position.

11. A gaseous fuel internal combustion engine comprising:
    an engine housing defining a main combustion chamber separated from a precombustion chamber by a flame communication passageway, and further defining a fuel supply passage with one end and an opposite end;
    a source of gaseous fuel fluidly connected to said opposite end of said fuel supply passage;
    a check valve, which includes a valve body with a valve seat and a valve member, positioned between said one end of said fuel supply passage and said precombustion chamber, and said valve member being movable between an open position and a closed position;
    said valve body and said valve member defining a fluid passage that fluidly connects said fuel supply passage to said precombustion chamber when said valve member is in said open position, and each of said valve member and said valve body define different segments of said fluid passage; and
    said valve body and said valve member substantially fluidly isolating said valve seat from said precombustion chamber when said valve member is in said closed position.

12. The engine of claim 11 wherein said valve member has a first fluid pressure surface exposed to fluid pressure in said precombustion chamber, and an opposing fluid pressure surface exposed to fluid pressure in said fuel supply passage.

13. The engine of claim 12 further comprising a stop component associated with said valve body;
    said valve member being in contact with said stop component when in said open position, but being out of contact with said stop component when in said closed position.

14. The engine of claim 13 wherein said valve member is mechanically unbiased.

15. The engine of claim 14 wherein said valve body and said valve member block said fluid passage at least two locations when said valve member is in said closed position.

16. The engine of claim 15 wherein said valve body defines a guide bore;
    said valve member includes a guide surface guided in said guide bore and a valve surface positioned adjacent said valve seat;
    said valve seat, said guide bore, said guide surface and said valve surface all share a common centerline; and
    a portion of said fluid passage is defined by said valve member and extends along said common centerline.

17. The engine of claim 13 wherein said stop component is at least one cylindrical dowel.

18. The engine of claim 13 wherein said stop component is a stop surface formed on said valve body.

19. A reaction chamber isolation check valve comprising:
a valve body having a conical valve seat and defining an inlet and an outlet;
an valve member positioned in said valve body between said inlet and said outlet and being movable between an open position and a closed position;
said valve body and said valve member defining a fluid passage that fluidly connects said inlet to said outlet when said valve member is in said open position; and
said valve body and said valve member substantially fluidly isolating said valve seat from said outlet when said valve member is in said closed position.

20. The check valve of claim 19 wherein each of said valve member and said valve body define different segments of said fluid passage; and
said valve body includes an internal wall that blocks a portion of said fluid passage when said valve member is in said closed position.

21. The check valve of claim 20 wherein one of said different segments includes a pair of cross passages and a parallel passage defined by said valve body;
said cross passages being oriented perpendicular to said common centerline; and
said parallel passage being oriented parallel to said common centerline.

\* \* \* \* \*